United States Patent

[11] 3,588,644

| [72] | Inventors | William H. Nash<br>South Milwaukee;<br>John Franklin Lapp; Fred S. Sadler,<br>Racine, Wis. |
|---|---|---|
| [21] | Appl. No. | 864,038 |
| [22] | Filed | Oct. 6, 1969 |
| [45] | Patented | June 28, 1971 |
| [73] | Assignee | McGraw-Edison Company<br>South Milwaukee, Wis. |

[54] ELECTRICAL APPARATUS AND STABILIZED DIELECTRIC THEREFOR
9 Claims, 4 Drawing Figs.

[52] U.S. Cl............................................. 317/259,
174/17, 252/65, 252/66
[51] Int. Cl............................................ H01g 3/04
[50] Field of Search.............................................. 174/17,
17.1; 317/259; 252/65, 66

[56] References Cited
UNITED STATES PATENTS

| 3,170,986 | 2/1965 | MacFayden.................. | 174/17 |
| 3,242,402 | 3/1966 | Stahr............................ | 317/259 |

Primary Examiner—E. A. Goldberg
Attorney—Charles A. Prudell

ABSTRACT: A dielectric composition for use in electrical apparatus such as a capacitor. The composition includes a halogenated aromatic dielectric liquid with the following additive, 1, 2 epoxy-3-phenoxypropane, and with or without the additive, bis (3, 4-epoxy-6-methylcyclohexylmethyl) adipate. A preferred composition comprises chlorinated diphenyl with additives of 0.15 percent 1, 2, epoxy-3-phenoxypropane and 0.25 percent bis (3, 4-epoxy-6-methylcyclohexylmethyl) adipate. This composition has a lower dissipation factor and a prolonged life characteristic.

PATENTED JUN 28 1971  3,588,644
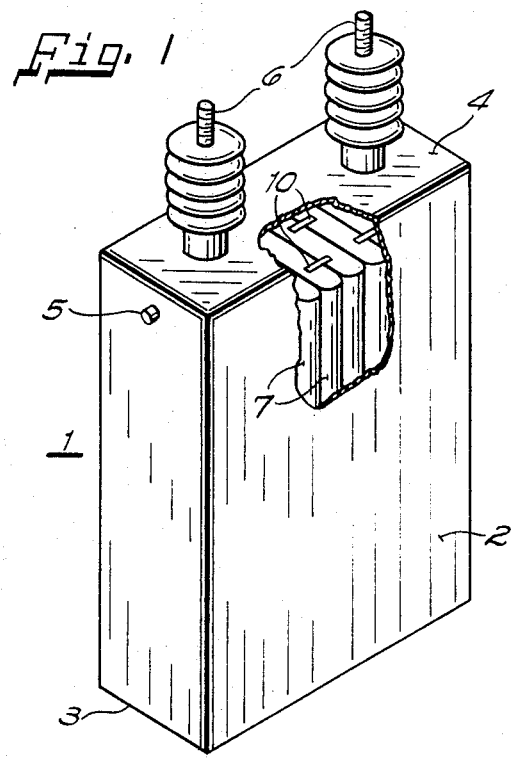
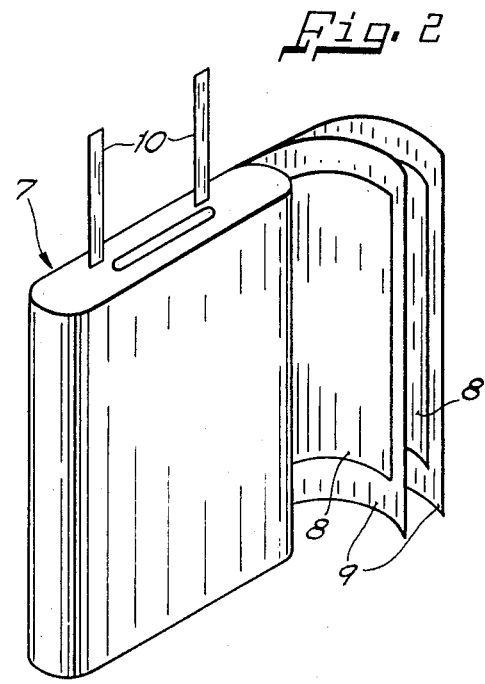
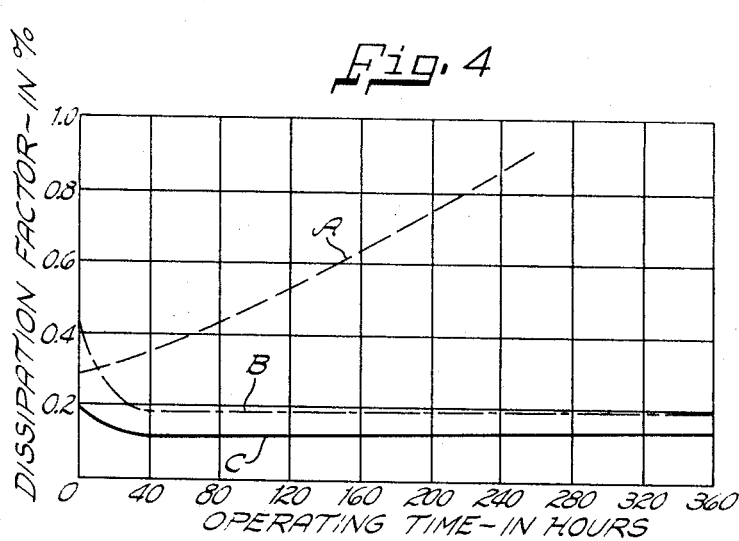
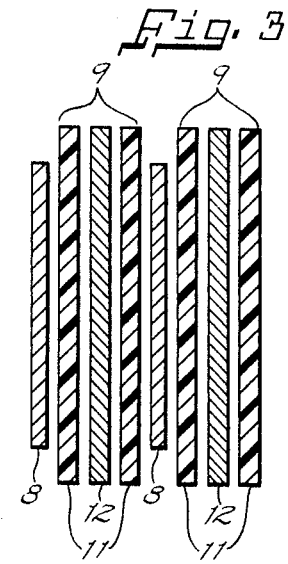
INVENTORS.
WILLIAM H. NASH
JOHN LAPP
FRED S. SADLER
BY Harold W. Guthman
ATTORNEY

ELECTRICAL APPARATUS AND STABILIZED DIELECTRIC THEREFOR

BACKGROUND OF THE INVENTION

This invention relates to improved dielectric insulation for electrical apparatus. In particular, this invention provides improved dielectric material for electrical capacitors.

Electrical apparatus designs and reliability have been determined frequently by the characteristics of the insulation available. Therefore, a considerable amount of research and development effort in the electrical art has consisted of optimizing the dielectric material compositions for a particular apparatus.

Dielectric material for electrical capacitors has been subject to continuing extensive research due to its importance for capacitor efficiency and reliability. Frequently these research results for dielectric insulation have proven applicable to other electrical apparatus, such as transformers, switches and cables, thereby benefiting a large segment of the electrical industry.

In the development of improved dielectric materials for capacitors, many of the improvements have consisted of additives to the halogenated aromatic compounds which have been used extensively in electrical apparatus. In particular, the chlorinated diphenyls have been considerably for the base material in capacitor dielectrics.

Operational breakdown of the dielectric material requires additives which neutralize the decomposition products that are formed. In the past, neutralizing agents or scavengers have been used that are epoxide compounds such as 1-epoxyethyl-3, 4,-epoxycylohexane; 3, 4-epoxycyclohexylmethyl-3, 4-epoxycyclohexanecarboxylate; and 3, 4-epoxy, -6-methyl-cyclohexanecarboxylate. The epoxide compounds have proven effective to rapidly neutralize the decomposition products, thereby improving the dielectric properties and service life of the capacitors.

OBJECTS AND SUMMARY OF THE INVENTION

It is an object of the invention to provide a dielectric compound having improved dielectric properties in electrical apparatus, such as capacitors.

It is an object of the invention to provide a dielectric compound that has a substantially longer service life in electrical apparatus, such as electrical capacitors.

It is an object to provide a dielectric compound that has lower dielectric losses over the entire operating temperature range in electrical apparatus such as electrical capacitors.

In general, the invention comprises a dielectric compound with a fundamental material of a halogenated aromatic compound, such as chlorinated diphenyl, with an additive of 1, 2 epoxy-3-phenoxypropane and with or without the additive, bis (3, 4-epoxy-6-methylcyclohexylmethyl) adipate.

BRIEF DESCRIPTION OF THE DRAWINGS

FIG. 1 is a perspective view of a typical capacitor employing the dielectric composition of the invention;

FIG. 2 is a perspective view of a capacitor pack;

FIG. 3 is an enlarged sectional view of a portion of the capacitor pack; and

FIG. 4 is a graph showing the improvement in the dissipation factor obtained by using the dielectric composition of the invention.

DESCRIPTION OF THE PREFERRED EMBODIMENT

FIG. 1 illustrates a typical capacitor comprising an outer casing 1, including sidewalls 2, a bottom wall 3, and a cover 4. In service the casing 1 is hermetically sealed and is provided with a small sealed fill hole 5 through which the dielectric liquid is introduced into the casing during fabrication. A pair of terminals 6 project through the cover and are insulated from the cover.

As illustrated in FIG. 1, a series of capacitor packs 7 are located within the casing 1 and each capacitor pack, as illustrated in FIG. 2, includes wound layers of metal foil 8 separated by a dielectric layer 9. The foil layers 8 may be formed of any desired electrically conductive material, generally a metallic material, such as aluminum, copper or the like. Electrodes 10 are connected to the foil layers 8, and the electrodes 10 of the various packs are connected together in series for final connection to the terminals 6.

The specific construction of the dielectric layer 9 is not critical to the invention, and any commonly used single or multiple layer dielectric system may be employed. In the specific construction illustrated in FIG. 3, the dielectric layer 9 includes a pair of sheets 11 of polyolefin resin separated by a sheet 12 of kraft tissue. The liquid dielectric of the invention is located within the casing 1 and impregnates sheets 11 and 12 of the dielectric layer 9.

During operation of the capacitor the aromatic dielectric liquid may decompose if subjected for long periods to voltage stress, to elevated temperatures, or to the action of reactive chemical agents. The decomposition products, such as hydrogen chloride, can deleteriously affect sheets 11 and 12 of the dielectric layer 9, as well as the dielectric liquid itself, and, thus, can lead to premature breakdown and failure of the capacitor.

According to the invention, the liquid dielectric includes a halogenated aromatic compound containing from 0.01 percent to 5.0 percent, and preferably from 0.2 percent to 1.5 percent by weight of 1, 2, epoxy-3-phenoxypropane as a scavenger which reacts with the decomposition products to lower the dissipation factor. In addition, it has been found that if 20 percent to 60 percent by weight of the additive 1, 2, epoxy-3-phenoxypropane is replaced by the additive bis (3, 4-epoxy-6-methylcyclohexylmethyl) adipate, the life characteristic is improved without adversely affecting the dissipation factor.

The halogenated aromatic compound is preferably a chlorinated diphenyl, and specific examples of the halogenated aromatic compound that can be employed are hexachlorodiphenyl, trichlorodiphenyl, tetrachlorodiphyenyl, trichlorobenzene, tetrachlorobenzene, and the like.

The prime additive, 1, 2-epoxy-3-phenoxypropane, is a mono-epoxide with the following formula:

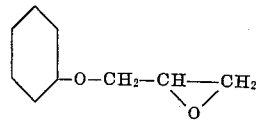

The secondary additive, bis (3, 4-epoxy-6-methylcyclohexylmethyl) adipate is a di-epoxide with the following formula:

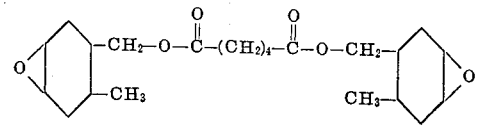

These additives serve the function of a scavenger. U.S. Pat. application Ser. No. 841,533, filed July 14, 1969, assigned to the assignee of the present invention, describes the second additive more fully.

These scavengers are miscible with the aromatic dielectric compound and have an exceptionally fast reaction rate with the decomposition products, such as hydrogen chloride, to thereby provide stable reaction products which will not increase the dissipation factor of the dielectric.

The casing 1 can be filled with the dielectric liquid of the invention by procedures well known in the art. One procedure that has been used satisfactorily is to heat the casing containing the capacitor packs to a temperature of at least 180° F. Next a vacuum is applied to remove any volatile matter such as water vapor. Subsequently, the dielectric liquid is added to impregnate the capacitor under vacuum while the capacitor temperature is maintained at between 120° F. to 170° F. This vacuum is maintained until the capacitor is fully impregnated, at which time the vacuum is released and the capacitor is sealed.

FIG. 2 illustrates the manner in which the individual capacitor packs 7 are constructed. Two metal foils 8 alternate between two dielectric layers 9. These foils 8 and layers 9 form a unit which is convolutely wound to form the capacitor pack 7 of predetermined capacitance value. Electrodes 10 are attached to alternate metal foils 8 so that the individual capacitor packs 7 may be connected to other capacitor packs 7 and to an external electrical circuit (not shown). After the individual capacitor packs 7 have been wound, they are flattened so that they may be efficiently spaced inside rectangular casing 1 shown in FIG. 1.

FIG. 3 illustrates the actual construction of a preferred design for the dielectric layer 9 which is interposed between metal foils 8. A sheet 12 of kraft tissue is placed between a pair of sheets 11 of a polyolefin resin. Sheet 12 of kraft tissue and the pair of sheets 11 of polyolefin resin comprise the dielectric layer 9. While this construction of dielectric layer 9 is preferred, any particular design is not considered critical to obtain the improved results through use of the novel dielectric composition impregnant disclosed herein.

For test purposes, the dielectric layer of FIG. 3 was used with two sheets of high density biaxially oriented polypropylene film separated by a kraft tissue sheet of 1.0 density, in an individual capacitor pack 7, as shown in FIG. 2. Results are shown in the graph designated FIG. 4 where the dissipation factor is plotted as a function of the operating time. Tests were conducted at room temperature, but with 167 percent of rated voltage applied to the electrodes 10, thereby serving as an accelerated life test.

Curve A shows the increase in dissipation factor with time when the control impregnant, a chlorinated diphenyl such as trichlorodiphenyl, is used in the dielectric layer 9. Chlorinated diphenyls have been known for having generally desirable qualities such as nonflammability, good coolant characteristics and good dielectric properties.

Curve B shows the improvement in dissipation factor with time when 0.5 percent of the additive bis (3, 4-epoxy-6-methylcyclohexylmethyl) adipate is added to the chlorinated diphenyl. As stated above, this is the subject of previously filed application Ser. No. 841,533.

Curve C shows the added improvement in dissipation factor when the additives, which are the subject of this invention, are utilized by adding them to chlorinated diphenyl. By coincidence, curve C represents the results of both aspects of this invention, namely, first, the addition of 1, 2 epoxy-3-phenoxypropane (0.3 percent for this curve C) to chlorinated diphenyl, and, second, an additive mixture with the addition of 1, 2 epoxy-3-phenoxypropane (0.15 percent for this curve C) plus the additive (3, 4-epoxy-6-methylcyclohexylmethyl) (3, 4-epoxy-6-m thylcyclohexylemthyl) adipate (0.25 percent for this curve C) to chlorinated diphenyl.

Further tests indicate that the prime additive, 1, 2-epoxy-3-phenoxypropane, has particular value in obtaining very low dissipation factors while the secondary additive, bis (3, 4-epoxy-6-methylcyclohexylmethyl) adipate, has particular value in greatly prolonging the effective life of the capacitor. Furthermore, a mixture of the primary and secondary additives within the range of 0.2 percent to 1.5 percent by total weight gives a result which surprisingly and effectively obtains the individual advantage of each additive. The optimum ratio of the primary additive to the total additive mixture appears to be in the 10 percent to 70 percent range.

In any event, the above primary additive, with or without this specific secondary additive, has illustrated an effective advance in the art with improved dielectric properties such as reduced dissipation factor and prolonged life.

Therefore, while the invention has been described above with certain specific compositions as additives to a fundamental dielectric liquid, those skilled in the art will recognize that numerous other equivalent compounds and additives may be included without departing from the actual scope of the invention.

We claim:
1. A dielectric composition comprising a halogenated aromatic dielectric liquid containing 0.01 percent to 5.0 percent by weight of 1, 2, epoxy-3-phenoxypropane.
2. A dielectric composition comprising a halogenated aromatic dielectric liquid containing from 0.01 percent to 5.0 percent by weight a mixture comprising 1, 2, epoxy-3-phenoxypropane and bis (3, 4-epoxy-6-methylcyclohexylmethyl) adipate.
3. A dielectric composition as defined in claim 2 in which 1, 2 epoxy-3-phenoxypropane comprises about 10 percent to 70 percent by weight of said mixture.
4 A dielectric composition as defined in claim 2 in which said halogenated aromatic dielectric liquid is a chlorinated diphenyl.
5. An electrical apparatus comprising a casing, a pair of spaced electrodes within said casing and a dielectric liquid extending between said electrodes, said liquid comprising a halogenated aromatic compound having dissolved therein as a scavenger from 0.01 percent to 5.0 percent by weight of 1, 2, epoxy-3-phenoxypropane.
6. An electrical apparatus as defined in claim 5 in which said halogenated aromatic compound is trichlorodiphenyl.
7. An electrical capacitor comprising a casing, a pair of electrodes within said casing separated by a dielectric layer, said dielectric layer including a dielectric material impregnated with a dielectric liquid, said dielectric liquid comprising a halogenated aromatic compound having dissolved therein 0.01 percent to 5.0 percent by weight of 1, 2 epoxy-3-phenoxypropane.
8. An electrical capacitor as defined in claim 7 in which said halogenated aromatic compound is a chlorinated diphenyl.
9. An electrical capacitor as defined in claim 8 in which said chlorinated diphenyl is trichlorodiphenyl.